Oct. 7, 1958 — R. W. STENZEL — 2,855,356
METHOD AND APPARATUS FOR TREATING EMULSIONS
Filed April 10, 1952 — 3 Sheets-Sheet 1
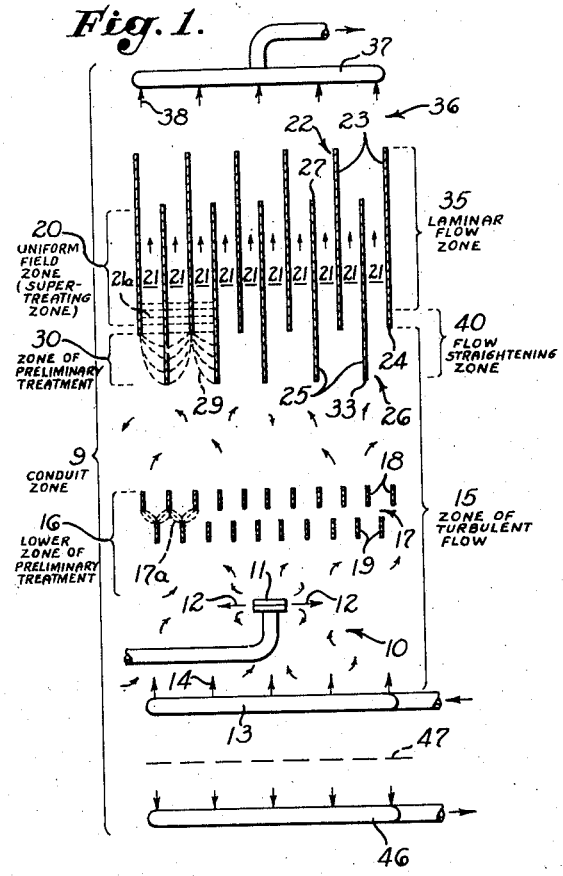
Fig. 1.
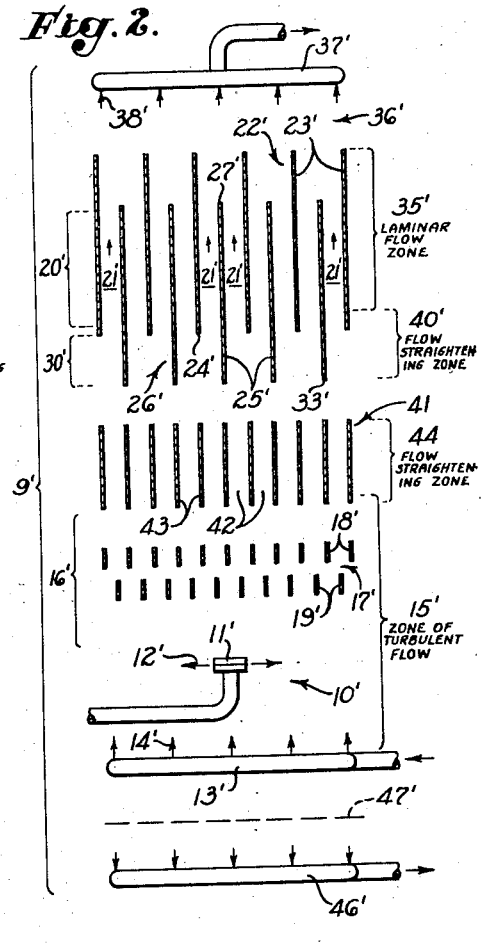
Fig. 2.
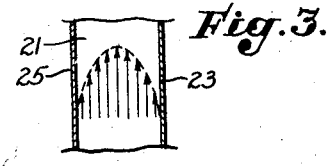
Fig. 3.
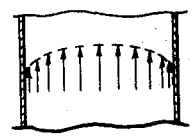
Fig. 4.
Fig. 5.
INVENTOR.
RICHARD W. STENZEL
BY HIS ATTORNEYS.
HARRIS, KIECH, FOSTER & HARRIS Oct. 7, 1958 R. W. STENZEL 2,855,356
METHOD AND APPARATUS FOR TREATING EMULSIONS
Filed April 10, 1952 3 Sheets-Sheet 2

INVENTOR.
RICHARD W. STENZEL
BY HIS ATTORNEYS.
HARRIS, KIECH, FOSTER & HARRIS

Oct. 7, 1958  R. W. STENZEL  2,855,356
METHOD AND APPARATUS FOR TREATING EMULSIONS
Filed April 10, 1952  3 Sheets-Sheet 3
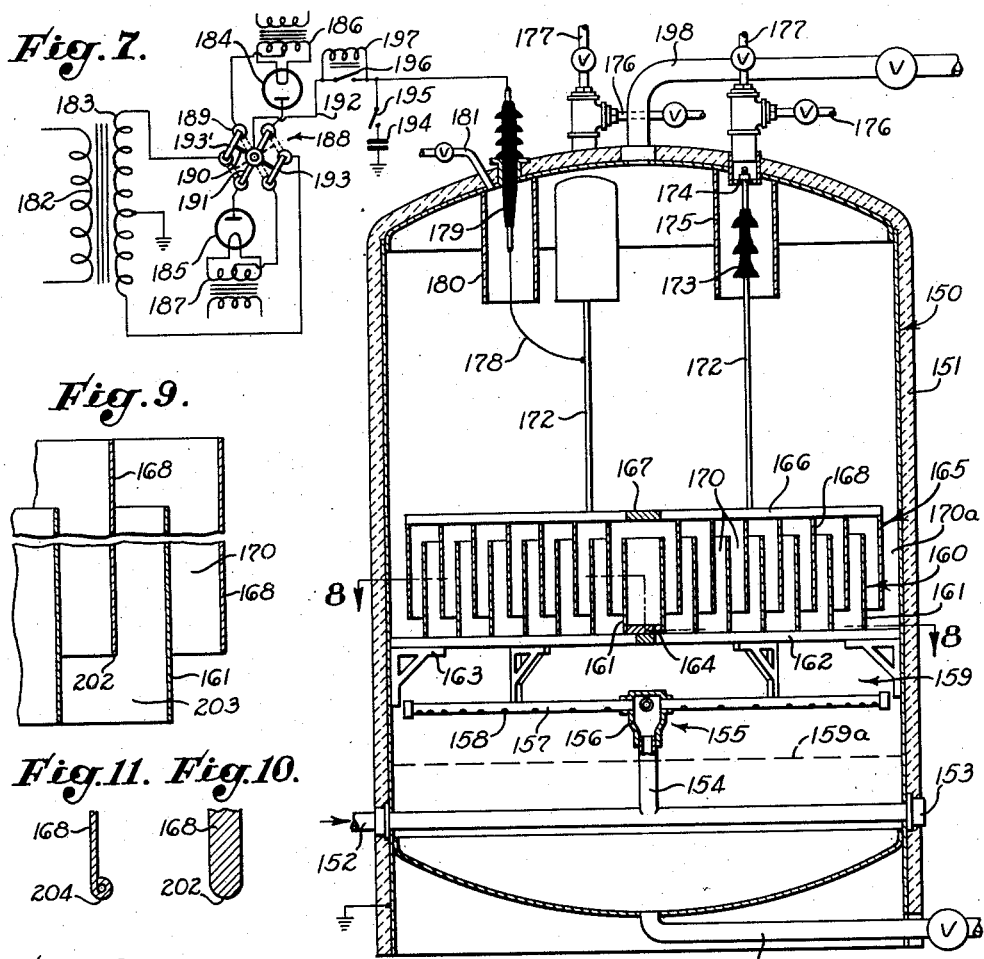
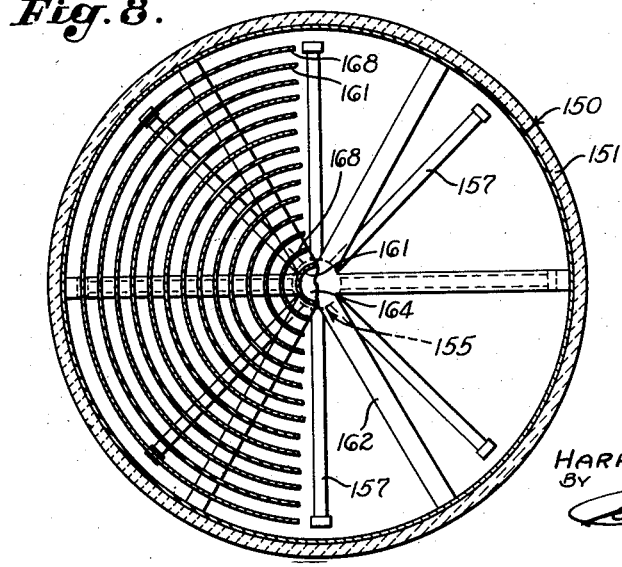
INVENTOR.
RICHARD W. STENZEL
BY HIS ATTORNEYS.
HARRIS, KIECH, FOSTER & HARRIS

United States Patent Office 2,855,356
Patented Oct. 7, 1958

2,855,356

METHOD AND APPARATUS FOR TREATING EMULSIONS

Richard W. Stenzel, Palos Verdes Estates, Calif., assignor to Petrolite Corporation, Wilmington, Del., a corporation of Delaware Application April 10, 1952, Serial No. 281,541

12 Claims. (Cl. 204—188)

This invention relates to the electric treatment of emulsions of the oil-continuous type, and more particularly to a new process and apparatus for the super-treatment of such emulsions by which the amount of the residual dispersed-phase material in the treated oil is reduced to a value far below that possible with older commercial processes.

It has previously been proposed to treat oil-continuous emulsions electrically in either of two ways. In small laboratory-size equipment it has been proposed to move the dispersed particles by cataphoresis in a unidirectional electric field to plate out on one of the electrodes, particularly when treating those emulsions in which the dispersed particles have relatively high electrophoretic mobility in the oil phase, the dispersed-phase material then collecting on such an electrode, and if sufficiently liquid, running down thereon and therefrom. While such separation is feasible with some few appropriate emulsions and in small laboratory-size equipment, it has not been found practical in commercial uses.

The other method of emulsion treatment involves predominantly an electrical coalescence of the dispersed droplets in a high-voltage electric field to form coalesced masses in the oil of sufficient size to gravitate therethrough. While early literature suggests that such coalescence is possible either in alternating-current or direct-current fields as concerns a process for reducing the water content of crude oil emulsions to pipe line requirements, the commercial art has exclusively employed electric fields of an alternating character in such electrical processes. Prior to the present invention all such commercial processes employed alternating-current fields because it had been found by experiment that under the conditions of flow and the configuration of the electric fields employed in such processes there was no advantage in utilizing D. C. fields and because of the general belief that A. C. fields are superior due to the polarity alternations or due to elimination of electrolytic or cataphoretic effects. Furthermore, it is much more economical to generate high-voltage A. C. fields than the corresponding D. C. fields.

In such electrical processes, a crude oil containing from 5% to 75% of water in the form of droplets dispersed in the oil is subjected to a high-voltage alternating-current electric field whereby the dispersed aqueous droplets are coalesced under highly turbulent flow conditions and then gravitationally separated from the oil phase. In this way, a large bulk of the water is separated but none of these commercial processes are able to reduce the amount of the residual dispersed water to less than about a few tenths of a percent even on those emulsions which treat easily. Furthermore, additional subjection of the thus-treated oil to another similar high-voltage treatment has little, if any, effect in removing such residual water. A new method which could reduce the residual dispersed-phase material of oil field emulsions considerably below that which is possible with previous methods would be of great importance and economic value to the oil industry. The presently-described process of the invention is capable of reducing such residual material to very low values.

In general, the new process herein described is capable, even at high commercial operating rates, of reducing the amount of residual suspended material in the treated oil to less than one-half and usually less than one-tenth of that possible with previously used commercial treating methods, it being a general object of the invention to provide a new process and apparatus producing such results.

With most oil systems, the new process can reduce the residual dispersed material to amounts as low as a few hundredths of a percent. In fact, when treating the lighter petroleum oils in the gravity range of gasoline, kerosene or diesel oil, it is possible to reduce the residual material to less than a few thousandths of a percent and usually to obtain completely clear products with only traces of suspended material, if measurable at all.

With heavier oils, in the gravity range of gas oils, the residual carry-over at commercial rates is usually in the neighborhood of a few hundredths of a percent and in the case of very viscous oils, such as heavy crudes or lubricating oils, the amount may be even a few tenths of a percent in commercial operation. However, this is still far less than it is possible to obtain on such heavy oils when using any other commercial electric treating or settling processes.

Modern electric treaters have been deliberately designed to produce electric fields substantially more intense adjacent one electrode than adjacent the other, or to employ fields which concentrate at the adjacent edges of one or both of the opposed electrodes. The voltage gradient measured along the lines of force of such a field is not uniform and has deliberately been made extensively higher adjacent one or both of the electrodes as compared with the gradient at the middle of the treating space. This has permitted localized zones of high gradient in which the coalescence is quite rapid, yet with zones of lower gradient which tend to prevent short-circuiting of the electrodes.

Furthermore, all commercial A. C. electric treaters at present in use are designed deliberately to maintain a degree of turbulence, usually a very high turbulence, in the electric field to disrupt so-called "chains" of dispersed particles tending to line up between the electrodes to form low-resistance paths which, unless disrupted, would tend to short-circuit the electrodes. Turbulence in the field has heretofore been considered essential in disrupting such chains, and all prior treaters have accentuated interelectrode turbulence by relative movement of the electrodes, rapid circulation through the interelectrode space, deflection of the emulsion in such space, violent jetting of the emulsion, use of thermally-induced turbulence, etc. Additionally, modern treater designs provide a ring-type circulation through closed circulation paths in the liquid of the treater for the purpose of repeatedly circulating treated oil or unresolved emulsion through the field, such circulations being established by jet action with attendant aspiration, by pump action, by temperature differences establishing thermal circulations, etc.

While use of such non-uniform gradient fields, such turbulence and such recirculation are quite useful in the electric treatment of emulsions containing relatively large amounts of dispersed material, in the range of several percent or greater, the present invention is based upon the discovery of a novel super-treating process and apparatus for the treatment of emulsions already low in dispersed-phase material and in which non-uniform fields, turbulence in the fields, recirculation paths, jet action, etc., are distinctly detrimental. To obtain this super-treating action, it has been found that tranquil or substantially non-turbulent flow in a unidirectional electric field between electrodes of relatively extensive area gives entirely unexpected results when treating emulsions of low dispersed-phase content. It is desirable that the emulsion entering the super-treating zones should contain no more than about 2% of dispersed-phase material and preferably only a small fraction of 1% thereof.

This does not mean that the process of the present invention must necessarily start with an emulsion of such low content of dispersed-phase material. The complete processes to be disclosed can employ a preliminary step by which emulsions high in dispersed-phase material may be processed to condition them for the super-treating actions to be described. In fact, this mode of operation is often preferred irrespective of the dispersed-phase content of the emulsion.

The present invention is concerned with a particular electric treatment of that class of emulsions in which the continuous phase is an oil and the dispersed phase consists of or includes dispersed particles or droplets which have dielectric constants sufficiently different from the dielectric constant of the oil to be coalesceable in situ in the oil under the action of a high-voltage unidirectional electric field to produce coalesced masses which can be readily separated from the oil phase. The present invention is not concerned specifically with the source of such emulsions but rather with the mode of their resolution, being useful in conjunction with naturally-occurring or artificially-made emulsions. The oil phase may be an animal, vegetable or mineral oil, or an oily material derived therefrom by fractionation or other means. Thus, as concerns mineral oils, the continuous-phase material may be a crude oil or a fraction, residuum or oily material derived therefrom. The dispersed-phase material is sufficiently insoluble in the oil phase to produce discrete particles or droplets therein capable of being coalesced when subjected to a high-voltage electric field. Most commonly, the dispersed-phase material is aqueous in nature but may be substantially water-free in some instances. Thus, the dispersed-phase material may be pure water or water with various solutes therein, such as salts, chemical agents, etc.; aqueous or substantially water-free reaction products or products resulting from contacting the oil with a solvent capable of associating with some component of the oil; or aqueous or non-aqueous particles; or droplets which may in themselves carry dispersed material. In some instances, the oil phase may be an oil-rich solution of oil and solvent, the dispersed phase being a solvent-rich solution of the oil and solvent.

The term "emulsion" as used in describing and claiming the present invention refers to stable or relatively stable dispersions or mixtures in which the dispersed-phase material differs in specific gravity from the continuous-phase material but separates relatively slowly or incompletely from the latter by sedimentation because of the presence of emulsifying agents at the interface, or because of minute particle size, or because of a combination of emulsifying agents and small size, or because of other factors such as relatively low concentration of the dispersed-phase material, etc.

The term "coalesce" as used in describing and claiming the present invention refers to the bringing together or agglomerating of dispersed particles while in situ in the oil phase and as a result of electrical action to produce masses of sufficient size to separate from the oil phase by difference in specific gravity. The bringing together or agglomerating of two or more fluid droplets usually results in a disruption of their protective interfacial films, membranes or molecular layers to result in a single larger droplet surrounded by a single and more extensive interfacial film, membrane or molecular-layer structure. On the other hand, the bringing together or agglomerating of dispersed droplets or particles may be more of an adhesion thereof with little or no disruption of interfacial films, membranes or molecular layers, the resulting mass being separable from the oil by difference in specific gravity. Such term "coalesce" or "coalescence" is used with reference to either type of action.

Objects of the invention are: to provide a novel method and apparatus in which the above-described super-treating action is obtained; to minimize and substantially eliminate interelectrode turbulence in at least the downstream portions of the super-treating zones; to provide a "once through" electric treatment of the emulsion to the exclusion of recirculation through the super-treating fields so that the treatment takes place in a single pass of the emulsion through a grid of inter-spaced electrodes; to limit the content of dispersed-phase material to a very low value at the time the emulsion enters the super-treating fields; to preliminarily treat the emulsion before entry into the super-treating fields to remove a portion of the dispersed-phase material therefrom if the content thereof is unduly high; to treat the emulsion while advancing forwardly as a plurality of small streams flowing along the super-treating zones; to move the emulsion preferably at substantially equal forward velocities from one zone of the treater to another; to flow a conduit-filling, container-filling or passage-filling large stream forwardly from an entrance zone through a grid of inter-spaced electrodes to an exit zone; to split such large stream into a plurality of streams flowing side-by-side and to separately treat such streams; to employ flow-straightening means to eliminate substantially all turbulence in the large stream before or during entry into or passage through the super-treating zones; to flow substantially all filaments of the cross section of the conduit-filling stream in a forward direction during the super-treating action while avoiding flows or currents transverse to the direction of flow; to effect the super-treating action in a field of substantially uniform voltage gradient measured along the lines of force of the field; to establish the super-treating field between electrodes sufficiently smooth that there are no appreciable localized field concentrations present in the super-treating zones at distances from the electrodes more than a small fraction of the electrode separation; to dispose a non-uniform gradient field at the entrance end of the super-treating zones; and to control the treatment so that the treated oil issuing from the super-treating zones contains less than one-half and often less than one-tenth of the amount of dispersed-phase material obtainable with prior commercial electric treating processes.

A further object is to combine a conventional high-voltage electric treating process with a super-treating process by which results far superior to either used separately can be obtained.

Another object is to subject an emulsion first to a high-voltage field of the non-short-circuiting type and then to a super-treating electric field of the type herein described; also to provide treating methods and apparatus of a character specified in each of the claims presented herein.

Further objects and advantages of the invention will be evident to those skilled in the art from the herein-contained description of exemplary embodiments.

Referring to the drawings:

Figs. 1 and 2 are diagrammatic views illustrating the principle and mode of operation of the invention in its preferred practice;

Figs. 3 and 4 diagrammatically illustrate flow conditions in a relatively narrow and a relatively wide treating space;

Fig. 5 is a graphical representation illustrating treating efficiencies at different electrode spacings;

Figs. 6 and 7 are vertical cross-sectional views of two embodiments of a complete electric treater employing the principle and mode of operation suggested in Figs. 1 and 2;

Fig. 8 is a horizontal sectional view taken along the line 8—8 of Fig. 7;

Fig. 9 is an enlarged detail, in section, of the electrodes in Fig. 7;

Fig. 10 is a greatly enlarged view of one of the electrodes of Figs. 7 and 9; and Fig. 11 is an enlarged sectional view of an alternative lower edge of such electrode.

Figure 6:
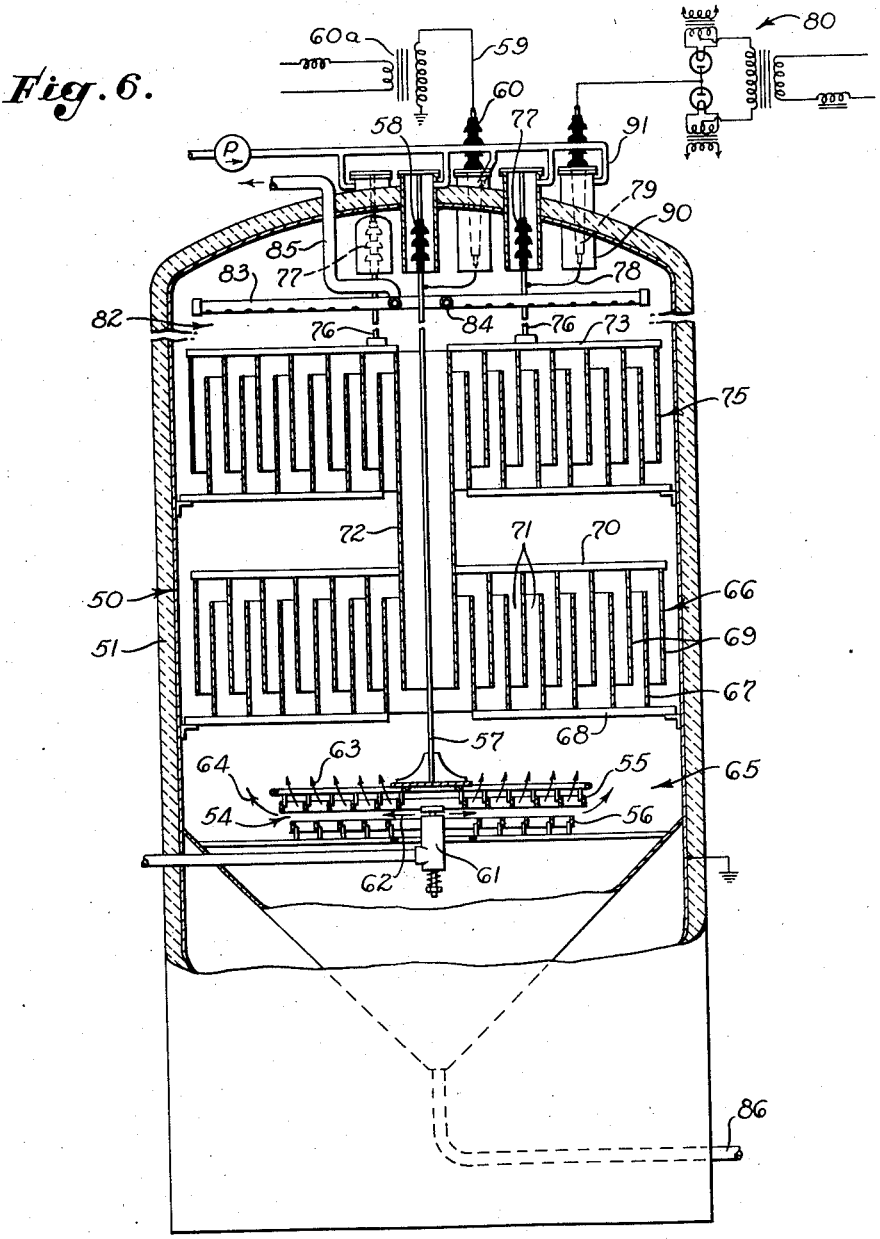

Referring to Fig. 1, which diagrammatically illustrates some of the principles of the invention and in large measure the mode of operation thereof, the equipment shown is such as would be used to treat a portion of the cross section of a fluid column confined to move longitudinally along a zone 9 of a conduit, not shown, in a direction upwardly of the paper. The incoming emulsion is introduced into a transverse zone of a fluid-filled entrance zone 10 by means such as a distributor 11 discharging a sheet of the emulsion radially outwardly as suggested by the arrows 12 or a manifold-type distributor 13 which discharges the emulsion as a plurality of streams as suggested by the arrows 14. Other types of distributors can be used, but it is preferable that they discharge the emulsion at a plurality of positions in a transverse zone of the entrance zone so as to tend to produce a conduit-filling or passage-filling fluid column which advances at substantially equal velocity in the various zones which make up its cross section.

Any such introduction in commercial-sized conduits and at commercial rates inevitably creates a turbulence or eddies in most or all of a zone 15 representing a zone of turbulent flow. This turbulence is suggested diagrammatically by the numerous curved arrows. At the same time, continued introduction of the emulsion will establish a conduit-filling or passage-filling flow of the emulsion constituents moving generally forward along the zone 9 of the conduit in a direction upwardly of the paper, there being considerable lateral components of motion due to turbulent flow.

The emulsion introduced into the conduit is preferably subjected to a preliminary treatment while in the zone 15 designed to separate some of the dispersed material of the emulsion and to condition the emulsion for the super-treating action to follow. This may be accomplished in a lower zone 16 of preliminary treatment as by flowing the emulsion through an electric field in a treating space 17 bounded by conventional electrode configurations, such as between lower edges of a nest of concentric rings 18 and upper edges of a nest of concentric rings 19 or through any electric field below the rings 19 if the latter are at a potential above ground potential. Concentrated fields are here often desirable, the field concentrating at the edges of the electrodes, the field pattern in the treating space 17 being indicated by dotted lines 17a. The electric field established in the treating space 17 or below its lower electrode may be of the alternating-current or direct-current type, either being substantially equally satisfactory in this region of the treater. Any such field may have a configuration and voltage characteristic such as is conventionally used in older methods of electrically treating emulsions and is preferably made non-short-circuiting by high turbulence, jet action, non-uniform voltage gradients, edge-bounded fields, etc. The principal reason for subjecting the emulsion to a preliminary treatment, in the zone 16 or elsewhere, is to condiiton the emulsion for the later super-treating action and to reduce the amount of dispersed-phase material of the emulsion to a value of the order of 2% or less, in order to obtain maximum treating efficiency in the super-treating fields to which the emulsion is subsequently subjected. In many cases it is possible to omit the electrodes 18 and 19 if the emulsion already contains a low concentration of the dispersed-phase material or if sufficient of the dispersed-phase material gravitates from the emulsion in the zone 16 or if there is sufficient treatment in the zone 30 to be described.

The final or super-treatment of the emulsion is accomplished by its passage through a uniform field zone 20 made up of a plurality of side-by-side supertreating zones 21 co-extensive in length with the uniform field zone 20. The super-treating zones 21 are in open-ended passages formed by a grid of inter-spaced electrodes. This grid is shown as including an electrode set 22 consisting of electrically-connected parallel electrodes 23 having anterior or stream-splitting edges 24 nested between anterior portions of parallel electrodes 25 of another electrode set 26 having posterior edges 27 nested between posterior portions of the electrodes 23, the super-treating zones 21 being formed between the overlapping portions of the electrodes 23 and 25. The electrode sets 22 and 26 are connected across a high-voltage source of unidirectional potential, the field patterns established by such electrode energization being shown by dotted lines 21a in Fig. 1 which represent lines of force of the field.

It will be observed that at the entrance portion to each super-treating zone 21 the unidirectional electric fields are non-uniform, as suggested by dotted lines 29 which represent lines of force which are more concentrated at the edges 24, thereby forming a zone 30 of preliminary treatment. The non-uniform fields in this zone supplement or may sometimes substitute for the fields in the treating space 17, coalescing the more easily treated emulsion particles to sufficient size so that they can gravitationally separate from the emulsion stream before it enters the super-treating zones 21. The emulsion entering these super-treating zones should have no more than about 2% of dispersed-phase material and preferably not more than one-half of 1% or less of this material. If the emulsion jetted into the entrance zone 10 contains more than about 2% of the dispersed-phase material or an amount too high to give the desired results in the super-treating zones and if sufficient of this material does not gravitate from the advancing stream shortly after discharge into the entrance zone, the non-uniform unidirectional electric fields in the zone 30, supplemented if necessary by the alternating-current or direct-current non-uniform fields in the treating space 17, serve to reduce the dispersed-phase material to the low contents indicated above.

In the super-treating zones 21, the electric field is of substantially uniform gradient, as suggested by the parallel dotted lines 21a representing lines of force transverse to the direction of emulsion flow, the field being of substantially uniform gradient measured along such lines of force. Additionally, it is desirable that the super-treating zones 21 be bounded by electrode surfaces sufficiently smooth and sufficiently free of sharp edges throughout the length of the super-treating zones that no appreciable localized field concentrations are present in these zones at distances from the electrodes more than a small fraction of the electrode separation. It is essential to the super-treating action that the fields in the super-treating zones 21 should be unidirectional. The super-treatment is usually not possible when operating with stable commercial emulsions of relatively high content of dispersed-phase material without the preliminary passage of the emulsion through a non-short-circuiting electric field where a substantial reduction in the amount of the dispersed-phase material can first be accomplished.

For commercial application and for structural purposes, it is often desirable to have the downstream or posterior portions of the electrodes 23 extend in a downstream direction beyond the posterior edges 27 of the electrodes 25, in which case non-uniform fields will be present beyond the exit ends of the super-treating zones 21. This, however, is of no consequence from a treating standpoint, being neither beneficial nor detrimental to the emulsion treatment, since by the time the emulsion passes through this region the super-treating action will already have taken place and the treated oil will have a negligible content of dispersed-phase material.

Considering the hydraulics of the treating system of

Fig. 1, it will be apparent that the turbulently advancing large stream in the entrance zone 10 is split or pierced by the front or anterior stream-splitting edges 33 of the electrodes 25, advancing forwardly from this point through the zone 30 as double-width streams until again split or bisected by the front or stream-splitting edges 24 of the electrodes 23, the preliminarily treated emulsion advancing beyond this point as single-width streams or segments into and along the super-treating zones 21. It is important to the invention to employ an electrode configuration which will adequately smooth out the flow of the emulsion so that, at least in the greater downstream portion of each super-treating zone, the flow is substantially laminar or substantially non-turbulent, or to otherwise establish a flow-straightening action ahead of the entrance portions of the super-treating zones 21 for this purpose and to avoid substantial turbulence and cross-currents in the forward flow of the emulsion while in these downstream portions of the super-treating zones. In the equipment illustrated in Fig. 1, some degree of flow straightening is obtained by passage through the inter-ring passages of the electrodes 18 and 19 but the anterior portions of the electrodes 23 and 25 form a further flow-straightening means and by proper design can be made to substantially eliminate turbulence so that the emulsion advances along at least the downstream portion of each super-treating zone in substantially laminar flow, such flow continuing through the super-treating zones and generally through a laminar-flow zone 35. Beyond this zone the separate streams join into a larger conduit-filling stream of treated oil advancing along an exit zone 36 from which the treated oil is withdrawn through a suitable outlet means. This outlet means may have a single orifice for withdrawing the treated oil but preferably is a collector 37 providing a plurality of orifices spaced from each other in a transverse zone of the exit zone 36, the treated oil entering at numerous points as suggested by the arrows 38. Such a manifold-type collector promotes substantially equal forward velocity in all of the super-treating zones 21 and avoids inducing cross-currents or non-uniform flow in these zones, being of particular value since it makes it possible to obtain uniform flow conditions in a most efficient manner.

In order to prevent the turbulent conditions existing in the entrance zone 10 from continuing in the super-treating zones of the process, the separation of the flow-straightening members should be relatively small, and the length of the path through the flow-straightening zone 40 should be relatively large compared with this separation. Preferably, the length of the flow-straightening zone should be at least twice and preferably four or more times the width of the super-treating zones 21, thus permitting the establishment of the smoothest flow possible in the major portion of each super-treating zone. For this and other reasons, it is desirable that the super-treating zones 21 should be narrow relative to their length, a ratio of at least 1:3 being desirable.

Fig. 2 illustrates the use of a flow-straightening means 41 to supplement the flow-straightening actions of the electrodes 18, 19 and of the electrodes 23, 25 in the zone 40. The flow-straightening means 41 may be a grid-like structure extending transverse to the forwardly flowing emulsion stream and providing open-ended passages 42 between members 43, these passages being narrow relative to their length, a ratio of at least 1:3 being desirable. This provides an auxiliary flow-straightening zone 44 and modifies some of the other zones of Fig. 1, the modified zones and the structural elements in Fig. 2 being indicated by primed numerals corresponding to those of Fig. 1. Thus, in Fig. 2 the zone of turbulent flow 15' is shorter than in Fig. 1, and the lower zone of preliminary treatment 16' is shown somewhat extended to take care of a situation where electric fields are established upstream of the rings 19' or downstream of the rings 18', as when such rings are at a potential above ground potential.

Fig. 3 illustrates the distribution of flow across a desirably narrow super-treating zone, the velocity being represented by forwardly pointing arrows. It will be seen that in this laminar flow, adjacent films or laminae of the emulsion have considerably different forward velocities. This is believed to be one of the contributing factors in the super-treating action. The differential velocity will be higher the closer the spacing of the electrodes, and it is preferred to use spacings that are relatively small for this and other reasons. High differential velocity between adjacent films of the forwardly advancing emulsion makes it possible for dispersed particles, which are too far apart to be coalesced by the imposed electric field, to approach each other more closely so that a rapid electrical coalescence is possible. This is at least in part an explanation for the effectiveness of the combination of electric field and hydraulic factors involved in the super-treating process.

In contrast, Fig. 4 represents the distribution of flow where the separation of the electrodes is much larger than in Fig. 3. Fig. 4 shows that for the same average forward emulsion velocity the differential motion between adjacent films is considerably less than in the case of smaller spacings.

The improved electric action with relatively narrow electrode spacings is graphically illustrated in Fig. 5 where the abscissa represents the spacing between adjacent electrode surfaces in inches and the ordinate represents the percentage of dispersed-phase material remaining after passage of an emulsion of the type herein concerned through super-treating zones of the general configuration of Fig. 1. At the smaller spacings extremely effective removal of the dispersed material is accomplished by use of unidirectional electric fields, but as the spacings are increased much above about four inches the beneficial results taper off. As a matter of fact, the superior effectiveness of treating with direct current is lost when operating in the larger electrode spacing range, above about six inches, where alternating current gives approximately the same treating results. While the curve of Fig. 5 was determined when treating a petroleum distillate containing an alkaline dispersed phase at a particular value of the voltage gradient, the same type of curve is obtainable for other emulsions at other gradients and exhibits the phenomenon that, with spacings larger than about six inches or about eight inches in some instances, the novel super-treating effect of the process described largely disappears and becomes in fact no more effective than when alternating current is used.

Considering the electric treatment which takes place in various portions of the system and the separation of the dispersed-phase material thereby effected, the incoming emulsion is first subjected to the non-uniform fields in the zones of preliminary treatment 16 and/or 30. Here the more easily treated emulsion particles are coalesced and gravitationally separate from the emulsion stream before it enters the super-treating zones 21 where the electric field is essentially uniform when viewed along the path transversely bridging the electrodes and wherein the turbulence in the preceding zones is substantially eliminated so that the flow through most of the length of each super-treating zone 21 is substantially laminar. In the zone of preliminary treatment 30, the somewhat non-uniform fields cause a considerable agitation of the particles, whirling these about in a random fashion and promoting considerable coalescence. On the other hand, the flow along the super-treating zones is smooth and desirably of substantially equal average forward velocity in each of the zones. To obtain the maximum beneficial effect of the super-treating action, hydraulic turbulence should be avoided in the super-treating zones.

The super-treating action is predominantly one involving coalescence of the widely-spaced dispersed particles into oil-dispersed masses of sufficient size to gravitate from the advancing stream. This is in contradistinction to any process in which the dispersed particles are of polarizable nature or carry fixed charges to move by electrophoretic action transverse to the advancing stream to deposit on and run down off one of the electrode surfaces. None of such processes have found commercial application because the electrophoretic mobilities are so low as to make such processes impractical. While the dispersed particles of many emulsions have measurable electrophoretic mobilities and thus may tend to migrate toward one of the electrodes, the present invention is not limited to treatment of such emulsions. The super-treating action herein involved is not one which relies upon an action in which the particles are plated out on one of the electrodes. In fact, in commercial operation of the present process, the forward velocity of the emulsion is such as to give a treating or residence time in the super-treating zones 21 that is grossly insufficient to permit substantially all of the particles to move by electrophoresis transversely of the advancing stream to deposit on either electrode.

That my process is predominantly one of coalescence of the particles in situ rather than a plating-out action on one or both of the electrodes has been proved by collecting samples of the coalesced material gravitating from the advancing stream at various transverse positions below the grid of interspaced electrodes. The average amount of coalesced material collected immediately below the electrodes 18 and 19 has been found to closely approximate the average amount collected below the mid-planes of the treating spaces 17.

On the other hand, the super-treating action is apparently facilitated if the dispersed particles of the emulsion have differing electrophoretic mobilities. In understanding this, it must be remembered that the dispersed particles present in the super-treating zones are minute and widely spaced. While the unidirectional electric field creates attractive forces between individual particles, these particles will not thereby be coalesced until they come relatively close together because the electric forces fall off rapidly with increase in the distance between the spaced particles. If two particles of different electrophoretic mobility are present, they will move transversely of the field at different velocities and the faster-moving particle will approach the slower-moving one, coming into such proximity that the electrostatic forces can then coalesce the particles. Such differential movement of two adjacent particles may also take place if the particles are respectively in adjacent laminae of the advancing emulsion stream, as illustrated in Figs. 3 and 4, thus facilitating coalescence of such particles.

If the general flow of the emulsion is vertically upward, the electrically coalesced masses produced in any of the zones 16, 20 or 30 or any coalesced masses produced by contact of particles in the entrance zone 10 will settle downwardly against the rising stream until they can be drawn off, usually as a continuous separate mass, by a draw-off device 46 communicating with a draw-off zone below the entrance zone 10. If the entire treating process takes place in a single tank, the separated phase may be maintained as a body of continuous liquid having an interface with the supernatant oil-continuous liquid in a zone suggested by the dotted line 47. If, on the other hand, the emulsion flows through the electric fields in a generally horizontal direction, the downward fall of the coalesced particles will be in a direction transverse to the emulsion flow, and the coalesced material will collect in a draw-off zone to one side of the passage along which the forwardly-advancing emulsion stream moves. However, there is considerable advantage in operating the process so that the emulsion flow is substantially vertical because the particles that are coalesced in the super-treating zones 21 then settle into the zones of preliminary treatment 30 and/or 16 where they are again increased in size by coalescence with each other and with the coarser particles already being treated in these zones so that more rapid sedimentation is possible. This is of substantial commercial importance since the throughput capacity of the treating equipment is thereby substantially increased.

The super-treating action of the present invention cannot be obtained by use of alternating-current fields applied to the same super-treating electrode system, contrary to any prior belief in the art that A. C. and D. C. fields are largely equivalent in treating crude oil emulsions. Nor is the super-treating action possible if the gradients measured at different positions along the midplane of each super-treating zone 21 are non-uniform in the sense of being locally concentrated because of the presence of points or edges on the electrodes giving a blast effect. The electrodes 23 and 25 are preferably smooth-surfaced elements with no surface irregularities within the super-treating zones that would establish non-uniform fields in a plane a small fraction of an inch from the electrode surface. Relatively high voltage gradients in the uniform fields of the super-treating zones are desirable. Depending upon the emulsions being treated, optimum results will be obtained with voltage gradients between about 4,000 volts per inch and 20,000 volts per inch or higher. It is preferable that the width of each of the super-treating zones 21 should be substantially the same and that the forward velocity in these zones should also be substantially the same, when such widths or velocities are measured in a plane perpendicular to the direction of flow. In other words, the forward velocity in opposed portions of adjacent super-treating zones is desirably substantially the same even if the velocity should increase or decrease somewhat during flow from end to end of any particular super-treating zone, as when this zone is tapered slightly or is of a wedge or frusto-conical shape.

A complete electric treater embodying the principles and mode of operation of Fig. 1 is shown in Fig. 6 as including a grounded conical-bottom container or conduit 50 completely insulated by a coating 51 to prevent localized differences in temperature such as would induce ring-type circulations through or linking with the super-treating zones or in the upper portion of the container. If the super-treating action is carried out at elevated temperatures, as is often desirable particularly when treating the heavier oils or distillates, its effectiveness is lessened by any localized cooling of the container or its contents, even by drafts or air currents, and this is prevented by the insulating coating 51. If the emulsion is to be heated, this should be done ahead of the treater, and any localized heating within the container 50 should be avoided.

A preliminary treating space 54 is defined between a live electrode 55 and a grounded electrode 56, these electrodes being made up of spaced concentric metallic rings mounted on suitable supports. The electrode 55 is suspended on a rod 57 hung from an insulator 58, this electrode being energized through a conductor 59 extending through a bushing 60 to a high-voltage source of alternating-current or direct-current potential, the former being suggested by the high-voltage transformer 60a. In this embodiment, the emulsion is discharged directly into the electric field established in the treating space 54 by a distributor 61, shown open but of the spring-closed type, which discharges a sheet of the emulsion radially as suggested by the arrows 62. Short-circuiting is prevented both by the high turbulence and velocity and by the edge-bounded fields which are highly concentrated at the edges of the electrodes 55 and 56. Portions of the emulsion rise between the rings of the electrode 55 as suggested by arrows 63 while other portions of the emulsion rise around the outer periphery as suggested by the arrows 64, thus tending to distribute the emulsion across the cross section of an entrance zone 65 to create a conduit-filling stream rising toward a lower grid of inter-spaced electrodes 66. Alternatively, the distribution system may be one or more perforated pipes placed in a transverse zone below the electrode 56, as suggested in Fig. 1.

The grid of electrodes 66 includes a plurality of concentric cylinders 67 secured to arms forming a support 68, the intervening spaces being bisected by concentric cylinders 69 depending from a support 70. The inter-spaced electrodes define a series of super-treating zones 71 as previously outlined but here of increasing cross-sectional area toward the container, although all of equal width including the outermost super-treating zone formed between the container wall and the outermost electrode 69. The support 70 is mounted on a metal tubular member 72 connected to a frame or support 73 of an upper grid of inter-spaced electrodes 75 identical with the lower grid 66. The support 73 is hung by rods 76 from three insulators 77, two of which are shown. One of the rods 76 is connected to a conductor 78 which extends through a bushing 79 to a high-voltage source of unidirectional potential 80 such as a half-wave or full-wave rectifier whether or not equipped with capacitors or inductances to smooth the pulses of the rectified current. This source of unidirectional potential energizes the upper electrode set of the grid of inter-spaced electrodes 75. The high-voltage current is conducted through the tubular member 72 to the upper electrode set of the lower grid of inter-spaced electrodes 66 to energize same.

The emulsion is preliminarily treated in the treating space 54 to remove some of the dispersed-phase material. The rising conduit-filling stream is split by the electrodes of the grid 66 and is subjected to a further preliminary treating action near the entrance ends of the super-treating zones 71 and to a super-treating action in such zones, as previously described. If an additional super-treating action is desired, the upper grid of inter-spaced electrodes 75 can be employed so that the emulsion is passed again through super-treating zones before reaching an exit zone 82 from which it is withdrawn through a collector 83 shown as a plurality of closed-ended pipes radiating from a manifold 84 connected to a pipe 85 through which the treated oil flows. The pipes of the collector provide orifices preferably spaced or sized to intake more of the treated oil toward the tank, e. g., the intake at any radial position may be substantially in proportion to the square of the radius to insure columnar flow in the container 50. The emulsion is preferably distributed in the entrance zone 65 and the treated oil withdrawn from the exit zone 82 in such way that the volume of each smaller stream advancing along a super-treating zone is in substantially the same proportion to the volume of the larger stream in the zones 65 or 82 as its cross-sectional area is to the total cross-sectional area of all the super-treating zones of the particular grid of inter-spaced electrodes.

It will be observed that all portions of the rising column of emulsion are subjected to super-treating fields of substantially uniform voltage gradient with the exception of a negligibly small central or by-pass stream rising through the space between the rod 57 and the tubular member 72. If the electrode 55 is eliminated or otherwise energized, the tubular member 72 can be blocked off to prevent this small flow, although with the arrangement shown the small stream of emulsion can be subjected to a unidirectional electric field between the rod 57 and the tubular member 72 if the transformers of a D. C. and an A. C. source are energized from the same line, albeit not a field of substantially uniform voltage gradient if the rod 57 is small. Alternatively, if the electrode 56 is energized by a D. C. source, the electric field between the rod 57 and the tubular member 72 can be made zero or small by having these elements of the same polarity, or can be made a double-voltage field if the elements are of opposite polarity.

In many instances, the lower grid of inter-spaced electrodes 66 can be eliminated. In other instances, this grid need not be energized, in which event it acts to some extent as a flow-straightening means for the upper grid 75. If the emulsion to be treated has a sufficiently low content of dispersed-phase material, the electrodes 55 and 56 can be eliminated or de-energized. However, with the arrangement shown, the dispersed material coalesced in any of the electric fields will drop to and through the field therebelow to aid the coalescing action therein. This is particularly desirable if the particles are merely agglomerated in an upper field because another field therebelow containing larger coalesced masses will usually cause the agglomerated masses to join with such larger masses and form single-phase larger masses which settle to form a body of liquid of the dispersed-phase material as distinct from a layer of incompletely resolved emulsion or sludge.

Use of the electrodes 55 and 56 is very desirable if the content of dispersed-phase material is initially such as would cause short-circuiting of the super-treating fields. The electrodes 55 and 56 establish a non-short-circuiting field because of the jet action, turbulence and non-uniform gradient therein so that these electrodes condition the emulsion for satisfactory treatment in the super-treating zone 71. The coalesced material from all of the fields collects in the conical bottom of the container 50 and is removed continuously or intermittently through a pipe 86.

In treating certain emulsions, it is very desirable that the insulators 58 and 77 and the lower portions of the bushings 60 and 79 should be protected from contact with the treated oil. This is preferably accomplished by placing each of these members in a separate open-bottom tubular member or shield 90 to form a pocket around such member. Pipes 91 communicate respectively with each of the pockets, and it is desirable to introduce into each such pipe a protective fluid to circulate through the pocket and discharge slowly from the open lower end thereof. This may be accomplished by manifolding the pipes 91, as shown, and by supplying the protective fluid to the manifold under pressure slightly higher than the treater pressure. The preferred fluid is an oil substantially free of suspended material, preferably an oil having a specific gravity less than, but in any event no greater than, the treated oil in the top of the container 50. The circulated material may be an oil of the same type as the continuous-phase of the emulsion being treated but should be free of suspended material and should preferably be of a specific gravity slightly less than that of the treated oil.

The treater shown in Figs. 7–9 embodies similar principles and constructional details although in a simplified form. Referring thereto, the treater includes a grounded tank or conduit 150 capable of withstanding pressures in the neighborhood of 50 p. s. i. or more and completely surrounded by a layer of insulating material 151. The emulsion to be treated is delivered under pressure to a pipe 152 having its far end closed by a plug 153, the emulsion flowing through a riser pipe 154 to a distributor means 155 comprising a manifold 156 with a number of end-capped pipes 157 radiating therefrom. The upper or lower surface of each pipe is perforated to provide openings 158 of substantial size and number which are preferably closer together toward the closed end of the pipe, representing a distributor means that may be used in any of the embodiments of the invention. The number of pipes 157 and the spacing of the openings 158 are preferably such that the volume of emulsion discharged at any radial position is substantially proportional to the square of the radius so as to produce a slowly rising mass or column of emulsion in an entrance zone 159, this rising column occupying substantially the entire horizontal cross-sectional area of the conduit above the position of discharge and moving slowly upwardly with substantially equal velocity at all radial positions. As before, the interfacial zone, indicated by the dotted line 159a corresponding to the line 47 of Fig. 1, is preferably below the distributor means 155.

The electrode assembly is a grid of inter-spaced electrodes functioning to establish super-treating unidirectional electric fields, the electrodes being of substantial area in the direction of emulsion flow. The electrode assembly includes a lower electrode 160 comprising a plurality of concentric cylinders 161 welded or otherwise secured to arms 162 comprising a foraminous framework resting on brackets 163 and thereby connected to the tank or conduit 150. This framework permits free vertical flow of the emulsion into the field zones. The innermost cylindrical electrode 161 in this embodiment is closed by a plug 164. An upper electrode structure 165 includes a similar electrode support composed of arms 166 radiating from a central member 167 and carrying depending cylindrical electrodes 168 bisecting the annular spaces between the electrodes 161 to provide super-treating zones 170 on opposite sides of each electrode 161 or 168, except that the outermost electrode 168 is spaced from the tank or conduit to provide a super-treating zone 170a of a width substantially equal to each of the zones 170 and except that there is no treating space within the innermost electrode 161 closed by the plug 164.

The upper electrode structure 165 is supported from three equidistant rods 172, two being shown in the section of Fig. 7, these rods hanging from insulators 173 each supported by a spider 174. Each insulator 173 is surrounded by a depending sleeve 175, and a dielectric fluid, such as an inert gas or a fluid of the type heretofore disclosed, is supplied to the interior thereof through a small valved pipe 176. The dielectric fluid is preferably continuously supplied in very small volume, or a body thereof can be entrapped in the sleeve 175 to prevent rise of the treated oil into contact with the insulator. The dielectric fluid can be withdrawn at intervals through a pipe 177 preparatory to replacement through the valved pipe 176. If a gas is employed, it may be any inert gas not tending to form an explosive mixture with the vapors from the oil, such as natural gas, nitrogen, or carbon dioxide.

A high-voltage, unidirectional potential is applied to the upper electrode structure 165 by a lead 178 insulated from the conduit by a bushing 179 and also protected by a sleeve 180 to which the dielectric fluid may be supplied through a small pipe 181. Any suitable source of high-voltage, unidirectional current can be employed, such as the full-wave rectifier circuit diagrammatically shown in Fig. 7. This includes a step-up transformer having a primary winding 182 and a secondary winding 183 with a center tap grounded as indicated. Rectification is obtained by two electron tubes, shown as vacuum diodes 184 and 185, with filament currents supplied from center-tapped secondary windings 186 and 187 of two filament transformers. A polarity switch 188 provides six circularly-arranged contacts 189 and three contact bars fixed to a spacing-insulating means 190 to be angularly movable as a unit through a 60° rotation from their full-line positions to their dotted-line positions. The central contact bar, indicated by the numeral 191, is connected to an electrode-energizing lead 192 and when in full-line position interconnects the anodes of the diodes. When in dotted-line position, this central contact bar 191 interconnects the center taps of the windings 186 and 187, thus controlling the polarity of the upper electrode structure 165. When in full-line position, the side contact bars, indicated by the numerals 193 and 193', connect the end terminals of the high-voltage secondary winding 183 respectively to the center taps of the windings 186 and 187. When in dotted-line position, these side contacts 193 and 193' connect these end terminals of the winding 183 respectively to the anodes of the tubes.

If not connected to the treater, the circuit thus far described will develop a typical unidirectional but pulsating potential. When connected to the treater, the capacitance of the electrode structures tends to smooth the wave form to produce a rippled wave. If less ripple or a constant-potential wave form is desired, additional filter elements can be imposed in this or other energizing circuits. For example, a condenser 194 can be placed in the circuit in parallel with the electrodes by closing a switch 195. Alternatively or in addition, a switch 196 may be opened to place a reactance 197 in series with the lead 192.

The treated oil and the separated dispersed-phase material are respectively withdrawn from the treater through draw-off pipes 198 and 199 at such rates as to maintain the interfacial level in the conduit 150 near the line 159a. The withdrawal rates may be regulated by valves in the pipes 198 and 199 to maintain a back pressure on the treater. Any suitable level control device known in the art can be used to control automatically the rate of withdrawal of the dispersed-phase material. In Fig. 7 the pipe 198 serves as a collector, withdrawing the treated oil at one central position—an embodiment that can sometimes be used when the electrodes are spaced substantially below the top of the container, but which embodiment is less desirable than the manifold-type collectors of the previously-described embodiments.

As shown in the enlarged fragmentary view of Fig. 9 and in the further enlarged showing of Fig. 10, the lowermost stream-piercing edges of the electrodes 168 may, if desired, be rounded to reduce field concentrations thereadjacent, the rounded edge being indicated by the numeral 202, either a rounded or substantially flat edge giving rise to the field pattern discussed with relation to Fig. 1 and there indicated by dotted lines 29. The upper ends of the electrodes 161 may be similarly rounded, if desired. As in Fig. 1, there will be a zone of preliminary treatment 203 between the electrodes 161 below each edge 202 which can be used to reduce the content of the dispersed-phase material in the emulsion. If the intensity of the relatively concentrated field in the zones 203 is to be reduced or if the electrodes 168 are to be reinforced, the lower edges of the electrodes 168 may be rolled to provide a rolled surface 204 shown in Fig. 11. Similar rolled edges may be provided at the upper ends of the electrodes 161. Such rolled surfaces will present larger areas at the electrode edge, leading to less concentration of the field thereadjacent.

In the embodiment of Figs. 7–9, the depending portions of the electrodes 161 serve as the initial flow-straightening means and circulatory currents are further damped out by the flow-straightening action of the lower ends of the electrodes 168, leading to a condition of tranquil or substantially laminar flow in the super-treating zones 170. As before, the overlap of the electrodes 161 and 168 should be sufficient that each super-treating zone 170 should be of a longitudinal length several times its width so that the desired super-treating action will be obtained.

As examples of the operation of the invention, the following are cited:

*Example 1*

In treating a distillate-continuous emulsion, containing only a small percent by volume of dispersed-phase material, in a treater of the type disclosed and with an applied unidirectional voltage of 16.8 kv. across 4" gaps, the treated distillate from the treater contained .004% of dispersed-phase material and was clear. This unidirectional voltage was then removed, and additional emulsion was supplied to the treater without energization of the electrodes. The dispersed material in the treated distillate increased to a commercially-unsatisfactory value of .03%, and the distillate was very cloudy. An alternating potential of 16.8 kv. was then applied. For approximately the first hour of operation with alternating current, the residual dispersed-phase material remained at .03% and for the next hour averaged .0275%, the distillate still being very cloudy. The alternating potential was then removed during continued supply of the emulsion, resulting in an effluent oil containing .04% dispersed-phase material. The original 16.8 kv. unidirectional potential was then reapplied. Within less than one-half hour, the amount of dispersed-phase material in the treated distillate fell to .002% and, with continued operation, to .001%, the distillate being brilliantly clear.

*Example 2*

A Mid-Continent light distillate containing about 1% by volume of acidic dispersed-phase material was treated at a temperature of 114–116° F. in a treater having a diameter of 30" and with a single set of concentric cylinder electrodes spaced to define supertreating zones each of a width of 2", the electrodes being energized from a source of unidirectional potential to establish a gradient of 10 kv./in. in each super-treating zone. The amount of residual dispersed-phase material was found to be .004% when the emulsion was treated at a rate of 1,000 barrels per day. Under the same conditions, but using alternating-current fields of approximately 10 kv./in. in the interelectrode spaces, the residual dispersed-phase material was found to be .017%.

*Example 3*

An emulsion of Mid-Continent light distillate containing about 1% by volume of a dispersed phase consisting largely of aqueous reaction products was treated in the same treater as in Example 2 at a rate of 1,000 barrels per day and with a unidirectional electric field of 6 kv./in. in the super-treating zones. The treated distillate contained .006% of dispersed-phase material. Without energization of the electrodes, the effluent treated distillate contained .90% of dispersed-phase material.

*Example 4*

A crude oil having a gravity of about 39° API and containing 1% by volume of a salty brine was treated in accordance with the process of this invention, a voltage gradient of 6.4 kv./in. being maintained in the uniform field region of the electrodes. When alternating current was used, the overhead carry-over of dispersed-phase material from the treater was 0.1% and the salt content was 40 pounds per thousand barrels of oil. With direct current applied to the electrodes, the carryover was reduced to .01% and the salt content to 7 p. t. b.

*Example 5*

A synthesized Mid-Continent crude oil emulsion was processed by the method of this invention, utilizing an embodiment similar to that shown in Fig. 6, except that only one set of concentric cylinder electrodes was used, e. g., the set 75 can be considered as omitted. The voltage gradient in the interelectrode spaces of each electrode set was 5 kv./in. Two sets of runs were made, in both of which alternating current was applied to the lower, non-uniform field electrodes. In the first set of runs, alternating current was also applied to the uniform field electrodes, the amount of dispersed water carried overhead by the treated oil being 0.2%. In the second set of runs, direct current was applied to such electrodes and the carryover was only .05%.

While I have heretofore indicated those features of the invention that are essential and those that are preferred, it should be understood that all of the preferred features need not necessarily be simultaneously present to obtain commercially acceptable results in treating some emulsions.

This application is a continuation-in-part of my application Serial No. 92,698, filed May 11, 1949, which is in turn a continuation of my application Serial No. 526,306, filed March 13, 1944, both entitled "Treatment of Mineral Oil Products," and both now abandoned.

Based on the teachings of the present application, various changes and modifications will be apparent to those skilled in the art and can be made without departing from the spirit of the invention. Likewise, the individual features of the various treaters may be incorporated in other of the illustrated or suggested embodiments without departing from the spirit of the invention.

I claim as my invention:

1. An electric treater for oil-continuous emulsions, said treater including: a container providing a passage having a longitudinal axis and having entrance and exit zones spaced therealong; an emulsion-discharge means having orifice means in said entrance zone; means for delivering the emulsion to be treated to said emulsion-discharge means under pressure to flow from said orifice means, said flow creating a passage-filling stream of emulsion advancing turbulently forward in the direction of said axis; spaced electrodes in said entrance zone and means for energizing same to establish an electric field therebetween for preliminarily treating said emulsion to coalesce some of the dispersed particles into gravitationally-separable masses and produce a stream of preliminarily treated emulsion advancing forwardly along said passage and having a materially reduced content of dispersed-phase material; a pair of electrode sets providing inter-spaced electrodes extending substantially longitudinally of said container, said electrodes defining open-ended side-by-side supertreating zones, said electrodes providing anterior flow-straightening portions terminating in anterior stream-splitting edges facing said stream of preliminarily treated emulsion to straighten the flow thereof and divide such stream into segments advancing side-by-side and substantially non-turbulently along said super-treating zones; a source of unidirectional potential; means for connecting said source to said electrode sets to establish unidirectional electric fields in said super-treating zones, the electrodes forming said super-treating zones being spaced from each other not more than about six inches and being of a longitudinal length at least three times the electrode spacing, said unidirectional electric fields coalescing dispersed particles in the entering emulsion into masses of sufficient size to gravitate from said entering emulsion to produce treated-oil segments discharging respectively from said super-treating zones into said exit zone to produce a passage-filling stream of treated oil advancing along said exit zone, the coalesced material from the preliminary electric field and from the unidirectional electric fields gravitating to and collecting as a body in a draw-off zone of said container; means for removing coalesced material from said draw-off zone; and means for continuously withdrawing treated oil from said exit zone.

2. An electric treater as defined in claim 1 in which said longitudinal axis is upright, and in which said super-treating zones are above said preliminary treating electrodes whereby said coalesced masses produced in said super-treating zones gravitate against the rising stream in said passage to said preliminary treating electric field for further coalescence therein with other dispersed particles of the incoming emulsion, said draw-off zone being below said entrance zone.

3. A process for the treatment of an oil-continuous dispersion containing greater than 2% of dispersed phase material comprising minute particles dispersed in the oil, which process comprises: advancing a relatively large stream of said dispersion through a first cross-sectional zone of a confined space; establishing in said first cross-sectional zone a pattern of electric fields having large differences in voltage gradient at different positions in said fields, said fields preliminarily treating said dispersion to coalesce some of said particles into oil-dispersed masses; separating at least some of said masses from the advancing stream of dispersion; advancing the thus preliminarily-treated dispersion forwardly through a second cross-sectional zone of said confined space and into a plurality of open-ended super-treating zones in said second cross-sectional zone defined by a plurality of electrodes spaced apart in side-by-side relationship in said confined space so that the preliminarily-treated dispersion is divided into a plurality of smaller streams, each of said super-treating zones having a width no greater than about 6 inches and a length several times its width, the preliminarily-treated dispersion containing no more than about 2% of said dispersed phase material at the time of entry into said super-treating zones; advancing said smaller streams forwardly in substantially laminar flow through said super-treating zones while avoiding any recirculation of the dispersion through said super-treating zones; subjecting the respective smaller streams in said super-treating zones to the action of unidirectional high-voltage electric fields having lines of force transverse to the direction of dispersion flow and of substantially uniform voltage gradient so that the dispersed particles of the preliminarily-treated dispersion grow into masses; separating these masses from the oil; and combining the streams of treated oil issuing from said super-treating zones into a larger stream advancing along said confined space.

4. A process for the treatment of an oil-continuous dispersion containing dispersed phase material comprising particles dispersed in the oil, which process comprises: continuously introducing a stream of said dispersion into a treating passage of a confined space to form a passage-filling stream of said dispersion advancing forwardly along said treating passage; electrically pretreating said dispersion by subjecting same in said confined space to the action of a plurality of high-voltage edge-bounded electric fields of nonuniform voltage gradient to coalesce some of said dispersed particles; forwardly advancing the thus pretreated dispersion into a plurality of side-by-side super-treating zones defined by a plurality of interspaced electrodes in said confined space so that the pretreated dispersion is divided into a plurality of small streams, each of said super-treating zones being of a width no more than about 6 inches and of a length at least three times its width, the pretreated dispersion containing no more than about 2% of dispersed phase material at the time of entry into said super-treating zones; advancing said small streams in substantially laminar flow along said super-treating zones while avoiding any recirculation of the pretreated dispersion through said super-treating zones; subjecting said small streams in said super-treating zones to the action of unidirectional high-voltage electric fields having lines of force transverse to the direction of dispersion flow and of substantially uniform voltage gradient so that residual dispersed particles of the pretreated dispersion grow into masses; separating such masses from the oil; and combining the streams of treated oil issuing from said super-treating zones to form a passage-filling stream of treated oil advancing along said confined space.

5. A process as defined in claim 4 in which the particles of dispersed phase material in the oil-continuous dispersion have electrophoretic mobility when the dispersion is in a unidirectional electric field, and including the step of controlling the forward velocity of each of said small streams in its respective super-treating zone to provide a time of residence of the dispersion therein substantially less than the time that would be required for substantially all such particles to move by electrophoresis transversely of such small stream of dispersion to deposit on either electrode.

6. A process as defined in claim 4 in which said stream of dispersion is introduced into an entrance zone of said confined space at a large number of entrance positions spaced from each other throughout a cross-section of said entrance zone to form said passage-filling stream of dispersion, in which said passage-filling stream of treated oil advances into an exit zone of said confined space, and in which treated oil is continuously withdrawn from said exit zone at a large number of exit positions spaced from each other throughout a cross-section of said exit zone.

7. A non-recirculating electric treater for reducing to very low values the amount of dispersed phase material in oil-continuous dispersions already low in such materials, such treater including: a container providing a laterally confined treating passage composed of entrance, intermediate and exit zones arranged successively along a flow axis of said passage, said exit zone being closed by an end wall; means for forming and advancing forwardly through said intermediate zone of said passage a passage-filling stream with all its segments in any cross-section of said intermediate zone advancing forwardly, said means including a multiple-orifice dispersion distributor in said entrance zone having discharge orifices distributed throughout a cross-section of such entrance zone, means for delivering the dispersion to be treated to said distributor under pressure, a multiple-orifice treated oil collector comprising a pipe network in said exit zone having a plurality of exit orifices receiving the treated oil and respectively distributed throughout a cross-section of said exit zone, and pipe means traversing said container and communicating with said pipe network for conducting a stream of treated oil therefrom to the exterior of said container; a grid of electrodes in said intermediate zone comprising sets of electrodes electrically insulated from each other and spaced from each other to define a plurality of treating spaces compositely occupying substantially the entire area of a cross-section of said intermediate zone so that substantially all portions of said stream pass through said treating spaces; a source of unidirectional high-voltage potential connected to said electrode sets to establish electric fields in said treating spaces, said fields causing said dispersed-phase material to grow into masses, said masses settling by gravity from said stream to a draw-off zone at the bottom of said container; and means for withdrawing such masses from said draw-off zone.

8. An electric treater as defined in claim 7 in which said pipe network in said exit zone includes a manifold and a plurality of orificed pipes extending therefrom providing said exit orifices, said orificed pipes being positioned between said grid of electrodes and said end wall, said end wall being spaced from said grid of electrodes a distance less than the width of said passage.

9. An electric treater as defined in claim 7 in which said flow axis is vertical and said container is an upright cylinder, said discharge orifices being distributed in said cross-section of said entrance zone in a manner to discharge proportionally larger volumes of dispersion at positions more removed from said flow axis than at positions closer to said flow axis, said exit orifices being distributed in said cross-section of said exit zone to intake proportionally larger volumes of treated oil at positions more removed from said flow axis than at positions closer to said flow axis, said discharge and exit orifices maintaining all said segments of said passage-filling stream of substantially equal forward velocity irrespective of the distance between any segment and said flow axis.

10. An electric treater for oil-continuous liquids, said treater including in combination: walls defining a chamber having a vertical axis and a horizontal zone transverse thereto; an upper set of concentric cylindrical electrodes in said horizontal zone, there being open-ended annular spaces between said concentric cylindrical electrodes; a lower set of concentric cylindrical electrodes intermeshed with said electrodes of said upper set in said horizontal zone and substantially bisecting said annular spaces, said upper and lower electrode sets forming open-ended annular treating spaces occupying substantially all of said horizontal zone; means for insulating said upper electrode set from said walls and for applying thereto a high-voltage undirectional potential; an ingress pipe means including a distributor below said horizontal zone, said distributor providing a plurality of orifices for discharging liquid to be treated, said liquid rising as a column and being divided into a plurality of streams by the lowermost edges of said concentric cylindrical electrodes; an egress pipe means including an upper pipe means communicating with the upper portion of said chamber and a lower pipe means communicating with the lower portion of said chamber; an auxiliary horizontal electrode between said distributor and said lower set of electrodes; and means for electrically connecting said auxiliary electrode to said upper electrode set.

11. An electric treater as defined in claim 10 in which said upper electrode set includes a frame and a plurality of concentric cylindrical electrodes depending therefrom, and including a support means extending downwardly from said frame through the innermost of such cylindrical electrodes, and means for mechanically connecting said auxiliary electrode to said support means.

12. A process for the treatment of an oil-continuous dispersion containing dispersed phase material comprising minute particles widely dispersed in the oil, which process comprises: turbulently flowing a relatively large passage-filling stream of said dispersion in a forward direction along a treating passage of a confined space; straightening the flow of such stream by passing said stream through side-by-side narrow flow-straightening zones in said confined space parallel to each other and to said forward direction to damp out turbulence and components of stream motion transverse to said forward direction; forwardly advancing the resulting dispersion into side-by-side open-ended super-treating zones positioned in said confined space adjacent but downstream from said flow-straightening zones and defined by a plurality of interspaced electrodes; advancing said dispersion as a plurality of small streams in substantially laminar flow forwardly through said super-treating zones while avoiding any recirculation of the dispersion through said super-treating zones, the width of each of said super-treating zones and of the stream of dispersion flowing therethrough being no more than about 6 inches, the length of each super-treating zone in the direction of forward advance of said small streams being at least three times its width; subjecting the dispersion stream to the action of high-voltage electric fields of nonuniform voltage gradient at a time preceding entry of the dispersion into said super-treating zones to coalesce some of the dispersed particles and produce a pretreated dispersion containing no more than about 2% of dispersed phase material at the time of entry into said super-treating zones; subjecting said small streams in said super-treating zones to the action of high-voltage unidirectional electric fields of substantially uniform voltage gradient established therein having lines of force transverse to the direction of flow of said small streams therein so that the minute particles remaining in said pretreated dispersion grow into larger oil-dispersed masses of dispersed phase material; gravitationally separating such larger masses from the oil; and combining the streams of treated oil issuing from said super-treating zones into a single large passage-filling stream advancing in said forward direction along said treating passage.

References Cited in the file of this patent

UNITED STATES PATENTS

| | | |
|---|---|---|
| 987,115 | Cottrell | Mar. 21, 1911 |
| 1,405,124 | Harris | Jan. 31, 1922 |
| 1,887,010 | Cage | Nov. 8, 1932 |
| 1,931,725 | Girvin | Oct. 24, 1933 |
| 2,092,491 | Adams | Sept. 7, 1937 |
| 2,099,063 | Hedberg | Nov. 16, 1937 |
| 2,105,614 | Roberts | Jan. 18, 1938 |
| 2,116,509 | Cottrell | May 10, 1938 |
| 2,182,145 | Eddy | Dec. 5, 1939 |

FOREIGN PATENTS

| | | |
|---|---|---|
| 110,940 | Australia | June 26, 1940 |